US011636082B2

(12) United States Patent
Roitman et al.

(10) Patent No.: US 11,636,082 B2
(45) Date of Patent: Apr. 25, 2023

(54) TABLE INDEXING AND RETRIEVAL USING INTRINSIC AND EXTRINSIC TABLE SIMILARITY MEASURES

(71) Applicant: International Business Machines Corporation, Armonk, NY (US)

(72) Inventors: Haggai Roitman, Yoknea'm Elit (IL); Guy Feigenblat, Givataym (IL); Mustafa Canim, Ossining, NY (US); Roee Shraga, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 16/908,768

(22) Filed: Jun. 23, 2020

(65) Prior Publication Data

US 2021/0397595 A1    Dec. 23, 2021

(51) Int. Cl.
*G06F 16/00* (2019.01)
*G06F 16/22* (2019.01)
*G06F 16/248* (2019.01)
*G06F 16/242* (2019.01)
*G06F 16/2455* (2019.01)

(52) U.S. Cl.
CPC ........ *G06F 16/2282* (2019.01); *G06F 16/221* (2019.01); *G06F 16/243* (2019.01); *G06F 16/248* (2019.01); *G06F 16/2423* (2019.01); *G06F 16/2455* (2019.01)

(58) Field of Classification Search
CPC .. G06F 16/2282; G06F 16/243; G06F 16/221; G06F 16/2455; G06F 16/2423; G06F 16/248
See application file for complete search history.

(56) References Cited

U.S. PATENT DOCUMENTS

| 9,405,794 | B2 | 8/2016 | Prakash | |
|---|---|---|---|---|
| 9,940,365 | B2 | 4/2018 | Zoryn | |
| 2016/0012052 | A1* | 1/2016 | Zoryn | ............... G06F 16/24578 707/728 |
| 2017/0322964 | A1 | 11/2017 | Wang | |

(Continued)

OTHER PUBLICATIONS

Xiaojun Wan, Manifold-Ranking Based Topic-Focused Multi_Document Summarization, aaai.org, IJCAI-07 2903-2908 (Year: 2007).*

(Continued)

*Primary Examiner* — Thu Nguyet T Le
(74) *Attorney, Agent, or Firm* — Dvir Gassner (57) ABSTRACT

Ad-hoc table retrieval, including: Representing each of a plurality of tables as a multi-field text document in which: different modalities of the table are represented as separate fields, and a concatenation of all the modalities is represented as a separate, auxiliary field. Receiving a query. Executing the query on the multi-field text documents, to retrieve a list of preliminarily-ranked candidate tables out of the plurality of tables. Calculating an intrinsic table similarity score for each of the candidate tables, based on the query and the auxiliary field. Calculating an extrinsic table similarity score for each of the candidate tables, based on a cluster hypothesis of the candidate tables. Combining: the preliminary rankings, the intrinsic table similarity scores, and the extrinsic table similarity scores, to re-rank the candidate tables.

18 Claims, 3 Drawing Sheets

(56) References Cited

U.S. PATENT DOCUMENTS

2019/0065502 A1* 2/2019 Lee ..................... G06F 16/951

OTHER PUBLICATIONS

Jingrui He, Manifold-Ranking Based Image Retrieval, ACM, MM'04 Oct. 10-16, 2004, p. 9-16 (Year: 2004).*

Shangsong Liang, Manifold Learning for Rank Aggregation, WWW '18: Proceedings of the 2018 World Wide Web ConferenceApr. 2018 pp. 1735-1744 (Year: 2018).*

Bin Xu, Jiajun Bu, Chun Chen, Deng Cai, Xiaofei He, Wei Liu, and Jiebo Luo. 2011. Efficient Manifold Ranking for Image Retrieval. In Proceedings of the 34th International ACM SIGIR Conference on Research and Development in Information Retrieval (SIGIR '11). ACM, New York, NY, USA, 525-534.

Chandra Sekhar Bhagavatula, Thanapon Noraset, and Doug Downey. 2013. Meth-ods for Exploring and Mining Tables on Wikipedia. In Proceedings of the ACM SIGKDD Workshop on Interactive Data Exploration and Analytics (IDEA '13). ACM, New York, NY, USA, 18-26.

Divesh Srivastava. 2010. Schema Extraction. In Proceedings of the 19th ACM International Conference on Information and Knowledge Management (CIKM '10). ACM, New York, NY, USA, p. 3.

Huan Sun, Hao Ma, Xiaodong He, Wen-tau Yih, Yu Su, and Xifeng Yan. 2016. Table Cell Search for Question Answering. In Proceedings of the 25th International Conference on World Wide Web (WWW '16). International World Wide Web Conferences Steering Committee, Republic and Canton of Geneva, Switzerland, 771-782.

James P. Callan. 1994. Passage-level Evidence in Document Retrieval. In Pro-ceedings of the 17th Annual International ACM SIGIR Conference on Research and Development in Information Retrieval (SIGIR '94). Springer-Verlag New York, Inc., New York, NY, USA, 302-310.

Kyle Yingkai Gao and Jamie Callan. 2017. Scientific Table Search Using Keyword Queries. CoRR abs/1707.03423 (2017). arXiv:1707. 03423 http://arxiv.org/abs/1707.03423.

Li Zhang, Shuo Zhang, and Krisztian Balog. 2019. Table2Vec: Neural Word and Entity Embeddings for Table Population and Retrieval. In Proceedings of the 42nd International ACM SIGIR Conference on Research and Development in Information Retrieval (SIGIR'19). ACM, New York, NY, USA, 1029-1032.

Lidan Wang, Jimmy Lin, and Donald Metzler. 2011. A Cascade Ranking Model for Efficient Ranked Retrieval. In Proceedings of the 34th International ACM SIGIR Conference on Research and Development in Information Retrieval (SIGIR '11). ACM, New York, NY, USA, 105-114.

Mathias Gery and Christine Largeron. 2012. BM25T: A BM25 Extension for Focused Information Retrieval. Knowl. Inf. Syst. 32, 1 (Jul. 2012), 217-241.

Michael J. Cafarella, Alon Halevy, Daisy Zhe Wang, Eugene Wu, and Yang Zhang. 2008. WebTables: Exploring the Power of Tables on the Web. Proc. VLDB Endow. 1, 1 (Aug. 2008), 538-549.

Oren Kurland. 2014. The Cluster Hypothesis in Information Retrieval. In Advances in Information Retrieval. Springer International Publishing, Cham, 823-826.

Pallavi Pyreddy and W. Bruce Croft. 1997. TINTIN: A System for Retrieval in Text Tables. In Proceedings of the Second ACM International Conference on Digital Libraries (DL '97). ACM, New York, NY, USA, 193-200.

Petros Venetis, Alon Halevy, Jayant Madhavan, Marius Paçca, Warren Shen, Fei Wu, Gengxin Miao, and Chung Wu. 2011. Recovering Semantics of Tables on the Web. Proc. VLDB Endow. 4, 9 (Jun. 2011), 528-538.

Rakesh Pimplikar and Sunita Sarawagi. 2012. Answering Table Queries on the Web Using Column Keywords. Proc. VLDB Endow. 5, 10 (Jun. 2012), 908-919.

Shuo Zhang and Krisztian Balog. 2018. Ad Hoc Table Retrieval Using Semantic Similarity. In Proceedings of the 2018 World Wide Web Conference (WWW '18). International World Wide Web Conferences Steering Committee, Republic and Canton of Geneva, Switzerland, 1553-1562.

Shuo Zhang and Krisztian Balog. 2019. Web Table Extraction, Retrieval and Augmentation. In Proceedings of the 42nd International ACM SIGIR Conference on Research and Development in Information Retrieval (SIGIR'19). ACM, New York, NY, USA, 1409-1410.

Yibo Sun, Zhao Yan, Duyu Tang, Nan Duan, and Bing Qin. 2019. Content-based table retrieval for web queries. Neurocomputing 349 (2019), 183-189.

Ying Liu, Kun Bai, Prasenjit Mitra, and C. Lee Giles. 2007. Tablerank: A Ranking Algorithm for Table Search and Retrieval. In Proceedings of the 22nd National Conference on Artificial Intelligence—vol. 1 (AAAI'07). AAAI Press, 317-322.

Ying Liu, Kun Bai, Prasenjit Mitra, and C. Lee Giles. 2007. TableSeer: Automatic Table Metadata Extraction and Searching in Digital Libraries. In Proceedings of the 7th ACM/IEEE-CS Joint Conference on Digital Libraries (JCDL '07). ACM, New York, NY, USA, 91-100.

* cited by examiner

Teams [edit]

| Draw position ◆ | Team ◆ | Pot ◆ | Confederation ◆ |
|---|---|---|---|
| A1 | Russia | 1 | UEFA |
| A2 | Saudi Arabia | 4 | AFC |
| A3 | Egypt | 3 | CAF |
| A4 | Uruguay | 2 | CONMEBOL |

FIGURE 1A

Standings [edit]

| Pos | Team | Pld | W | D | L | GF | GA | GD | Pts |
|---|---|---|---|---|---|---|---|---|---|
| 1 | Uruguay | 3 | 3 | 0 | 0 | 5 | 0 | +5 | 9 |
| 2 | Russia (H) | 3 | 2 | 0 | 1 | 8 | 4 | +4 | 6 |
| 3 | Saudi Arabia | 3 | 1 | 0 | 2 | 2 | 7 | −5 | 3 |
| 4 | Egypt | 3 | 0 | 0 | 3 | 2 | 6 | −4 | 0 |

TABLE INDEXING AND RETRIEVAL USING INTRINSIC AND EXTRINSIC TABLE SIMILARITY MEASURES

BACKGROUND

The invention relates to the field of computerized information retrieval.

Information retrieval systems typically operate by receiving a query and searching for pertinent information in a corpus of electronic data—be it text, images, audio, video, or any other type of data. For example, Web search engines receive user queries and search for respective information in the World Wide Web. Technically, the searches are conducted in a centralized index of the World Wide Web maintained by each search engine, to facilitate near real-time provision of search results. Similar indexing and searching exist in many organizational information retrieval systems, which are used for conducting searches in the organization's internal collection (corpus) of electronic documents and other data.

Electronic documents, which typically contain unstructured data in the form of free text, sometimes also include tables—which are a form of structured data. Since tables are organized in accordance with a certain schema which offers column and/or row labels, they can be regarded as small, structured databases. Data contained in tables is often of high quality, and enabling information retrieval systems to index and search such tabular data is of great benefit.

Due to the vast number of tables used in HTML (HyperText Markup Language) documents on the World Wide Web, a field known as "Web table retrieval" has emerged, and various automated table retrieval techniques have been proposed. One of the fundamental tasks of these techniques is termed "ad-hoc table retrieval," and involves, for a given query in natural language, returning a ranked listed of the most relevant tables found in the pertinent corpus.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment is directed to a method that includes: Representing each of a plurality of tables as a multi-field text document in which: different modalities of the table are represented as separate fields, and a concatenation of all the modalities is represented as a separate, auxiliary field. Receiving a query. Executing the query on the multi-field text documents, to retrieve a list of preliminarily-ranked candidate tables out of the plurality of tables. Calculating an intrinsic table similarity score for each of the candidate tables, based on the query and the auxiliary field. Calculating an extrinsic table similarity score for each of the candidate tables, based on a cluster hypothesis of the candidate tables. Combining: the preliminary rankings, the intrinsic table similarity scores, and the extrinsic table similarity scores, to re-rank the candidate tables. Providing an ordered list of the re-ranked candidate tables.

Another embodiment is directed to a system that includes (a) at least one hardware processor; and (b) a non-transitory computer-readable storage medium having program code embodied therewith, the program code executable by said at least one hardware processor to automatically: Represent each of a plurality of tables as a multi-field text document in which: different modalities of the table are represented as separate fields, and a concatenation of all the modalities is represented as a separate, auxiliary field. Receive a query. Execute the query on the multi-field text documents, to retrieve a list of preliminarily-ranked candidate tables out of the plurality of tables. Calculate an intrinsic table similarity score for each of the candidate tables, based on the query and the auxiliary field. Calculate an extrinsic table similarity score for each of the candidate tables, based on a cluster hypothesis of the candidate tables. Combine: the preliminary rankings, the intrinsic table similarity scores, and the extrinsic table similarity scores, to re-rank the candidate tables. Provide an ordered list of the re-ranked candidate tables.

A further embodiment is directed to a computer program product which includes a non-transitory computer-readable storage medium having program code embodied therewith, the program code executable by at least one hardware processor to automatically: Represent each of a plurality of tables as a multi-field text document in which: different modalities of the table are represented as separate fields, and a concatenation of all the modalities is represented as a separate, auxiliary field. Receive a query. Execute the query on the multi-field text documents, to retrieve a list of preliminarily-ranked candidate tables out of the plurality of tables. Calculate an intrinsic table similarity score for each of the candidate tables, based on the query and the auxiliary field. Calculate an extrinsic table similarity score for each of the candidate tables, based on a cluster hypothesis of the candidate tables. Combine: the preliminary rankings, the intrinsic table similarity scores, and the extrinsic table similarity scores, to re-rank the candidate tables. Provide an ordered list of the re-ranked candidate tables.

In some embodiments, said calculation of the intrinsic table similarity score comprises, for each of the candidate tables: extracting candidate passages from the auxiliary field using a partially-overlapping sliding window; calculating a relevancy of the query to each of the candidate passages; biasing the calculated relevancies in favor of candidate passages appearing earlier in the auxiliary field; and using a highest one of the biased calculated relevancies as the intrinsic table similarity score of the table.

In some embodiments, said calculation of the extrinsic table similarity scores comprises: calculating an inter-table similarity of every pair of tables of the candidate tables; and performing manifold-based ranking of the candidate tables, based on the calculated inter-table similarities and on the preliminary rankings.

In some embodiments, the multiple modalities of the table comprise at least some of: a title of an electronic document which contains the table; a caption of the table, appearing adjacent to the table in the electronic document; a schema defined by column labels of the table; and tabular data contained in cells of the table.

In some embodiments, the tabular data comprise: an ordered concatenation of rows of the table from top to bottom, wherein, in each of the rows: when the table is in a language written from left-to-right, cells of the row are concatenated from left to right; when the table is in a language written from right-to-left, cells of the row are concatenated from right to left.

In some embodiments, said retrieval of the list of preliminarily-ranked candidate tables is based on individual weights that are assigned to the separate fields of the multi-field text documents.

In some embodiments, a further modality of the table comprises contents of the electronic document which contains the table; and said retrieval of the list of preliminarily-ranked candidate tables is based on a relevance of the query to the contents of the electronic document.

In some embodiments, said retrieval of the list of preliminarily-ranked candidate tables is based on an interestingness score calculated for each of the tables, wherein the interestingness score increases with greater diversity of tabular data contained in earlier-appearing columns of the table.

In some embodiments, said combination is performed in the following order: (i) the extrinsic table similarity scores are combined with the preliminary rankings; and (ii) the intrinsic table similarity scores are combined with (i).

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein is a technique, embodied in a system, method, and computer program product, for ad-hoc table retrieval. Given a query, the present ad-hoc table retrieval technique retrieves a ranked list of the most relevant tables in a given table corpus. Advantageously, the technique utilizes both intrinsic (passage-based) and extrinsic (manifold-based) table similarity scoring to enhance the relevancy of the retrieved tables to the query.

Figure 1A:
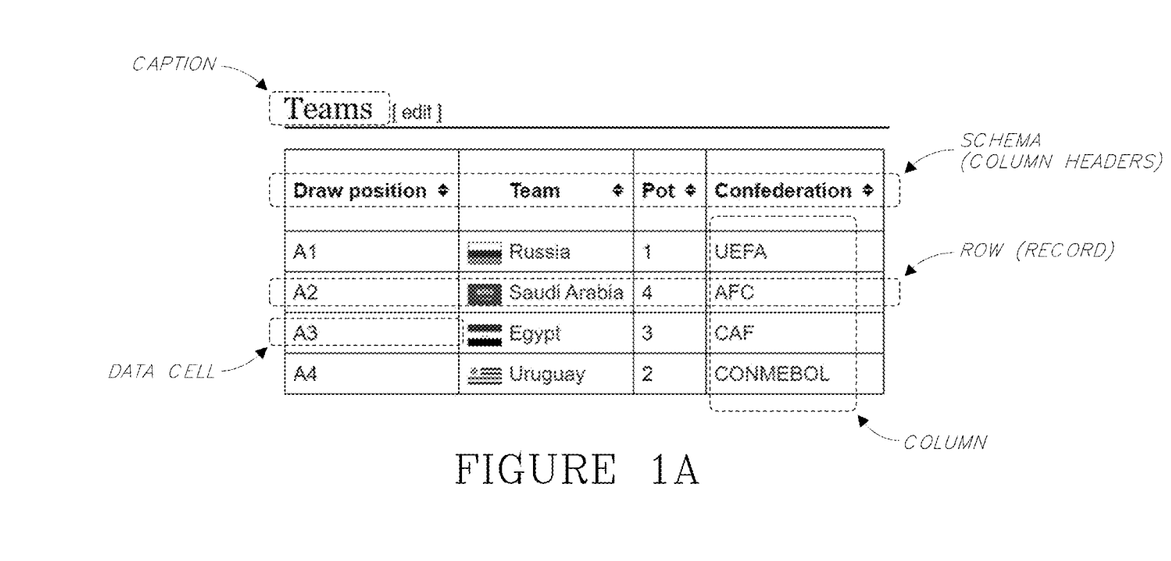
FIGS. 1A and 1B show two exemplary tables which include related but different information.
Figure 1B:
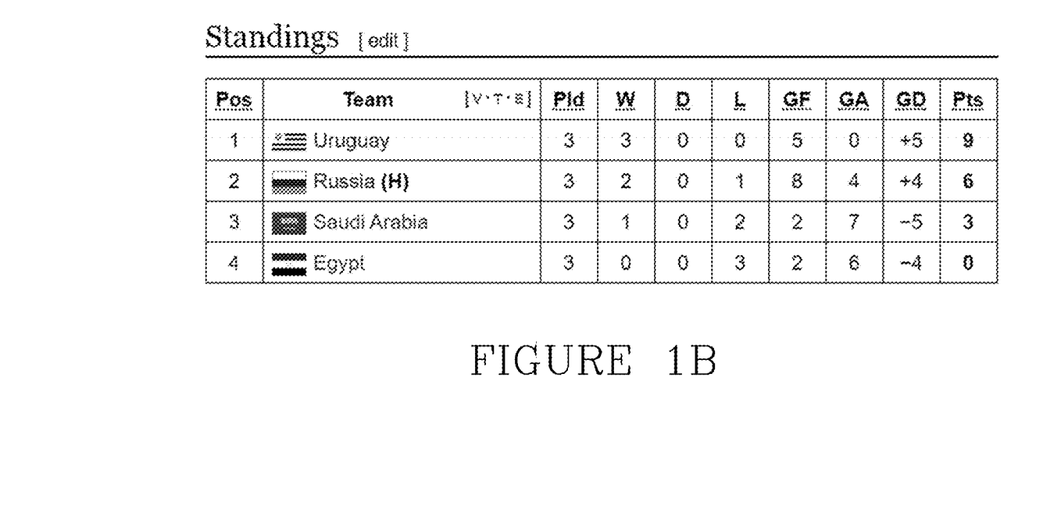

Reference is now made to FIGS. 1A and 1B, which show two exemplary tables taken from Wikipedia contributors, "2018 FIFA World Cup Group A," Wikipedia, The Free Encyclopedia, https://en.wikipedia.org/w/index.php?title=2018_FIFA_World_Cup_Group_A (last accessed Jun. 12, 2020).

Each of these tables, much like every typical table, includes the following modalities: caption—a textual description of the table's contents or topic that usually appears immediately above or below the table; schema—column headers (also "column labels") and their relative order; columns—each being a vertical array of data cells positioned below a column header; and rows (also "records")—each being a horizontal array of data cells intersecting all columns. The contents of the data cells of a table are also referred to as the "tabular data" or simply the "data" of the table. An additional modality is the title of an electronic document (referred to herein simply as "document") containing the table. For example, the electronic document containing the tables of FIGS. 1A-1B is the HTML (HyperText Markup Language) document located at https://en.wikipedia.org/w/index.php?title=2018_FIFA_World_Cup_Group_A, whose title is "2018 FIFA World Cup Group A." If a certain table appears inside a specific section of a multi-section electronic document, then that section's title may be used in addition to or instead of the title of the whole document. Yet a further optional modality is the entire contents of the document containing the table, serving as an additional context to the table.

One intrinsic table similarity source is textual passages, extracted from a concatenation of some or all of the table modalities. This improves the focus of the retrieval process. FIGS. 1A-1B depict a motivating example; while only the table of FIG. 1B should be relevant to a query like "points won by Russia in the 2018 world cup", the table of FIG. 1A may be still retrieved if using some naïve table retrieval technique. Using a focused retrieval approach, however, allows to discover that the table of FIG. 1B contains more relevant information to the query. As another example, the relevance estimation of the table of FIG. 1B to a query like "WC 2018 Group A team positions" would be improved by further considering only the text that appears in the schema of that table, such as the first column header "Pos" (short for "Position") and the second column header "Team."

One extrinsic table similarity source is table-to-table similarities, that are leveraged to implement a manifold-based ranking of a group of tables. This approach has its influence by the known "Cluster Hypothesis in Information Retrieval", according to which similar documents tend to behave similarly with respect to relevance to information needs. See Oren Kurland, "The Cluster Hypothesis in Information Retrieval," in Advances in Information Retrieval, Springer International Publishing, Cham (2014), 823-826. It is shown herein, and evidenced in the Experimental Results section below, that this hypothesis can be well applied to tables, which are represented here as multi-field documents.

As a motivating example, consider again the two tables in FIGS. 1A-1B. Both tables are almost equally relevant to the query "2018 cup group A teams," yet the table of FIG. 1B is more relevant to the query "2018 cup group A leader team." Hence, the former case calls for assigning relevance scores that are more or less the same for both tables, while the latter case calls for scoring the table of FIG. 1B much higher.

To accommodate such table scoring considerations, implemented here is a regularized manifold-based ranking approach (see Dengyong Zhou et al., "Ranking on Data Manifolds," in Proceedings of the $16^{th}$ International Conference on Neural Information Processing Systems (NIPS'03), MIT Press, Cambridge, Mass., USA, 169-176 (2003)), calculating inter-table similarities across multiple table modalities. This may improve table ranking by refining preliminary scores that are initially assigned by a given baseline retrieval method.

Given an initial pool of table candidates, obtained by some baseline retrieval method that preliminarily ranks the candidates, the candidates are then re-scored using a combination of the intrinsic and extrinsic table similarity scores. To this end, utilizing an effective, cascade-based table re-ranking approach, the final table ranking may be obtained.

Figure 2:
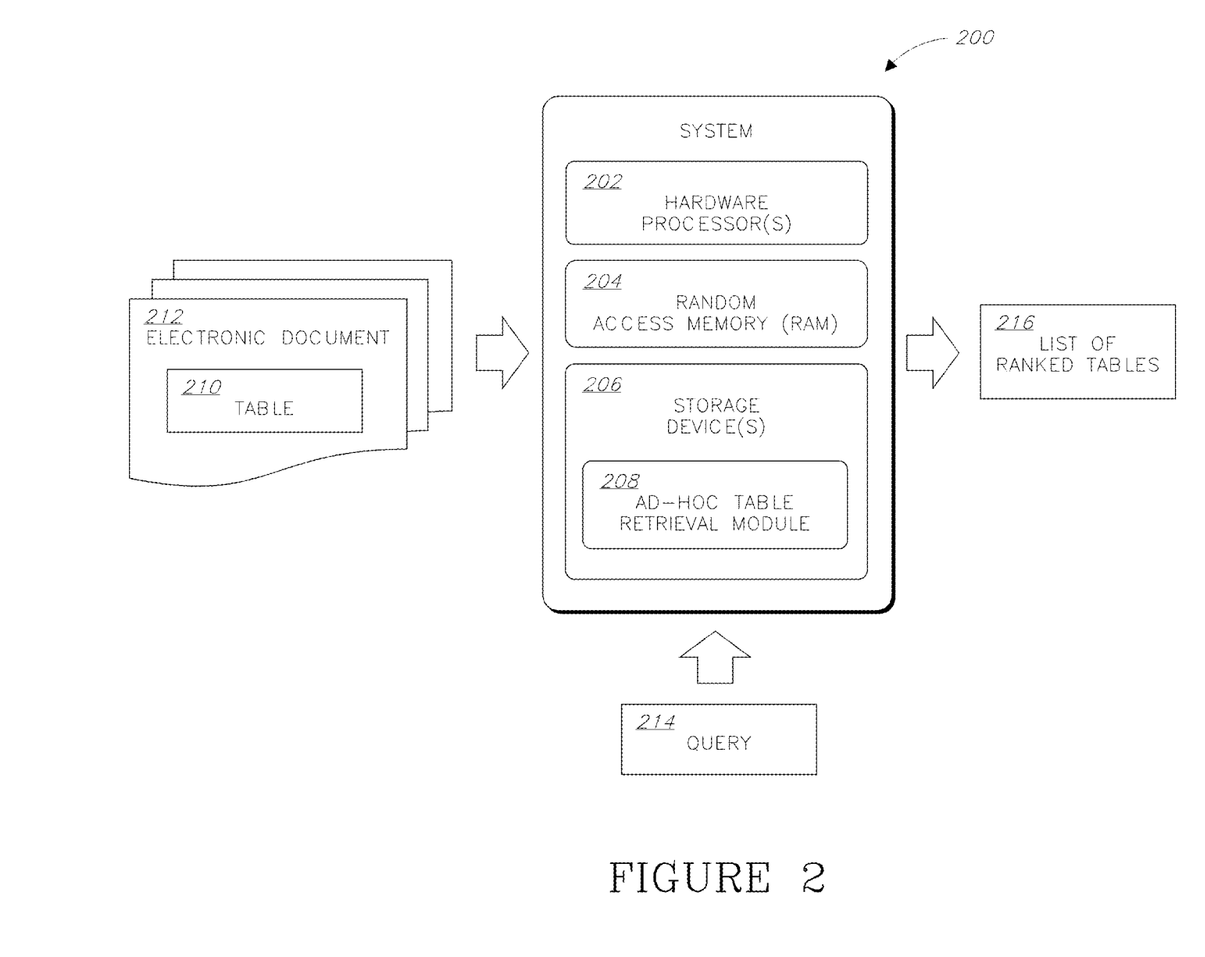
FIG. 2 shows a block diagram of an exemplary system for ad-hoc table retrieval, in accordance with an embodiment.

Reference is now made to FIG. 2, which shows a block diagram of an exemplary system 200 for ad-hoc table retrieval, according to an embodiment. System 200 may also be referred to as a table indexing and retrieval system, a table indexing and search system, or the like. System 200 may include one or more hardware processor(s) 202, a random-access memory (RAM) 204, and one or more non-transitory computer-readable storage device(s) 206.

Storage device(s) 206 may have stored thereon program instructions and/or components configured to operate hardware processor(s) 202. The program instructions may include one or more software modules, such as an ad-hoc table retrieval module 208. The software components may include an operating system having various software components and/or drivers for controlling and managing general system tasks (e.g., memory management, storage device control, power management, etc.), and facilitating communication between various hardware and software components.

System 200 may operate by loading instructions of ad-hoc table retrieval module 208 into RAM 204 as they are being executed by processor(s) 202. The instructions of ad-hoc table retrieval module 208 may cause system 200 to receive tables 210 (and optionally also electronic documents 212 containing these tables), receive a query 214, process the tables (and optionally the electronic documents) and the query, and output a list of ranked tables 216.

System 200, as described herein, is only an exemplary embodiment of the present invention, and in practice may be implemented in hardware only, software only, or a combination of both hardware and software. System 200 may have more or fewer components and modules than shown, may combine two or more of the components, or may have a different configuration or arrangement of the components. System 200 may include any additional component enabling it to function as an operable computer system, such as a motherboard, data busses, power supply, a network interface card, a display, an input device (e.g., keyboard, pointing device, touch-sensitive display), etc. (not shown). Components of system 200 may be co-located or distributed (e.g., in a distributed computing architecture), and may alternatively be run as one or more cloud computing "instances," "containers," and/or "virtual machines," as known in the art.

Moreover, system 200 may be separated into a first system that conducts all "static" operations—those that are independent of a query and can be optionally performed in advance of receiving queries, and a second system that conducts all "dynamic" operations—those being dependent of a query and therefore performed only in response to receipt of the query. To this end, the pertinent functionalities of ad-hoc table retrieval module 208 may be divided between two modules disposed in the first and second systems, respectively.

Figure 3:
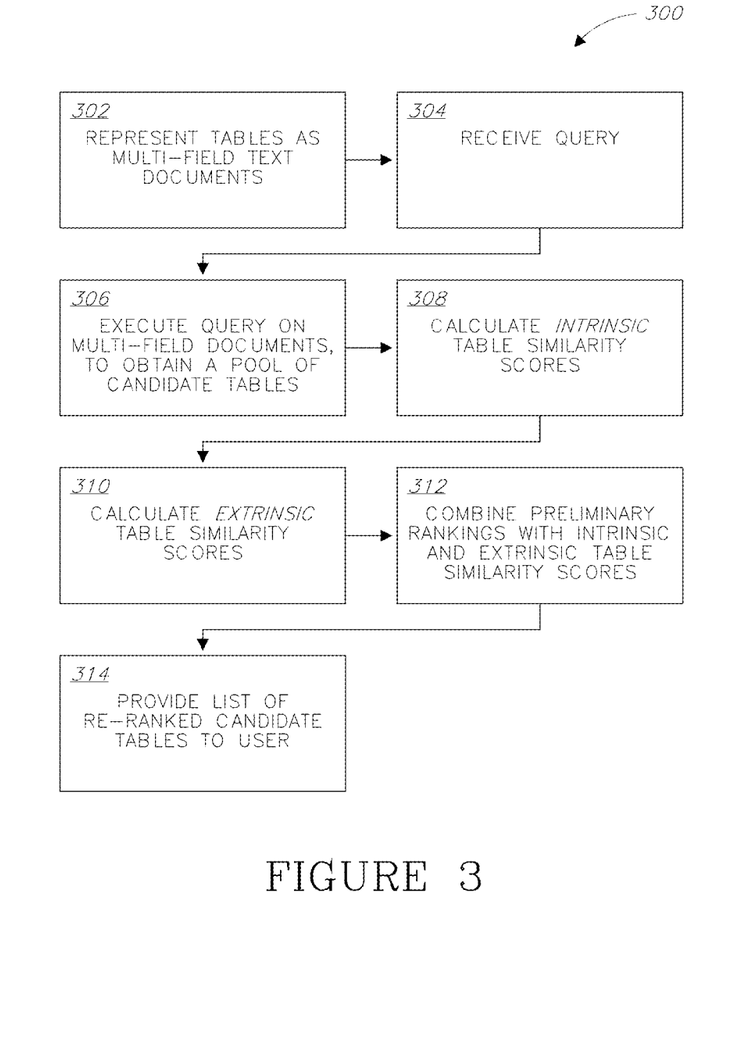
FIG. 3 shows a flowchart of an exemplary method for ad-hoc table retrieval, in accordance with an embodiment.

The instructions of ad-hoc table retrieval module 208 are now discussed with reference to the flowchart of FIG. 3, which illustrates a method 300 for ad-hoc table retrieval, in accordance with an embodiment.

Steps of method 300 may either be performed in the order they are presented or in a different order (or even in parallel), as long as the order allows for a necessary input to a certain step to be obtained from an output of an earlier step. In addition, the steps of method 300 are performed automatically (e.g., by system 200 of FIG. 2), unless specifically stated that a certain step (or a portion thereof) involves manual action of a user.

In the description of method 300, for a given natural language query (also referred to as a "keyword" query) q and table T in a table corpus $\mathcal{T}$, let $s_q(T) \stackrel{def}{=}$ score (q, T) denote T's relevance score to q. The goal of the ad-hoc table retrieval technique of method 300 is to retrieve a ranked list of top-k tables $(T_1, T_2, \ldots, T_k)$ from $\mathcal{T}$ (satisfying $\forall i \in \{1, 2, \ldots, k-1\}$: $s_q(T_i) \geq s_q(T_{i+1})$) which are the most relevant to q. k is a tunable number that can be adjusted based on user preference of how many tables to return in response to a query. For example, k can be between 1-10, 11-100, or even over 100.

In step 302 of method 300, each of a plurality of tables in table corpus $\mathcal{T}$ may be represented as a multi-field text document, in which some or all of the different modalities of the table are represented as separate fields, and a concatenation of all these modalities, namely— title‖caption‖schema‖tabular data, is represented as another, separate, "auxiliary" field. This auxiliary filed is utilized, as discussed below, for passage retrieval.

The tabular data modality may be represented by orderly concatenating the contents of the table records (rows) from top to bottom, and, in each of the rows, from the left data cells to right ones. Of course, the latter applies if the table is in a language written from left-to-right, such as most Indo-European languages. In right-to-left languages, such as Hebrew, Arabic, and Persian, table schema is often mirrored, and each of the rows may therefore be concatenated from right to left.

Such multi-field text document representation allows performing passage retrieval on each table, to obtain passages that capture coherent text regions within the table's metadata (i.e., title, caption, and schema modalities) and data (i.e., table rows).

The multi-field text documents representing the tables of table corpus $\mathcal{T}$ may be stored, for example, in an index maintained by system 200 (FIG. 2).

In step 304, a query is received. The query may be in natural language, namely—include one or more keywords (optionally including, other than words, also numbers and/or symbols). The query typically expresses a certain specific information need, such as "which team won Group A of the 2018 World Cup?"

Method 300 assumes the availability of some initial pool of candidate tables, which are then re-scored ("re-ranked") according to their intrinsic and extrinsic similarities. Accordingly, in step 306, the query may be executed on the multi-field text documents using a conventional, "baseline" table retrieval method, in order to retrieve a pool (list) of preliminarily-ranked candidate tables out $\mathcal{T}$.

Such baseline method may be naively implemented by concatenating all of a table's data and metadata into a single "chunk" of text and representing the table as a single-field document. Then, any conventional retrieval method may be applied, such as TF-IDF, BM25, a language model-based method, etc.

Better yet, in present embodiment, the representation of the tables as multi-field text documents may be leveraged in favor of better retrieval relevancy already in step 306, by assigning individual (and usually differing) weights to table modalities (fields). For example, the multi-field table documents may be scored using a late fusion approach, as follows:

$$s_q^{multi}(T) \stackrel{def}{=} \sum_f \varphi_f \times s_q(T[f]), \tag{1}$$

where $s_q(T[f])$ and $\varphi_f$ denote, respectively, the score and relative weight (having $\Sigma_f \varphi_f = 1$) of field f of table T's multi-field document.

As an optional extension, the retrieval of step 306 is additionally based on the relevance to the query of the document (referred to herein as "article" whenever it is needed to avoid confusion with the "multi-field document") containing each table. Given table $T \in \mathcal{T}$, let $D_T$ denote the table's containing article. Given query q, the relevance score of T may be combined with that of $D_T$. This may be implemented using the multi-field document representation, by adding to it a "context" field that stores the contents of the article. Then, an extended basic score for each table may be obtained, for example, using the following linear interpolation approach:

$$s_q^{InterP}(T) \stackrel{def}{=} \lambda \times s_q^{multi}(T) + (1-\lambda) \times s_q(D_T), \quad (2)$$

where $s_q(D_T)$ denotes the article's score and $\lambda \in [0,1]$ is a tunable interpolation parameter. Both table and article scores may be sum-normalized relatively to the score of other tables (and their corresponding containing articles) in the candidates pool. In case a table's article is not available for some reason, it may be assigned a score that is at least as the minimum score among the available table articles.

As another optional extension, the retrieval of step 306 is additionally based on an interestingness score calculated for each of the tables. The interestingness score may be static, namely—independent of the query. The calculation of this score may based on two main observations: First, the most important tabular data usually resides on its left-most columns (assuming a left-to-right language), and second, more informative columns are those that contain diverse values. Hence, it is assumed that such more informative tables attract more attention from searchers.

To this end, let $c_j$ now denote the $j^{th}$ table column of a given table T with overall m columns in its schema. For a given table score $s_q(\cdot)$, the tables may be re-scored as follows:

$$s_q^{TabInt}(T) \stackrel{def}{=} s_q(T) \times [\alpha + s^{colEnt}(T)^\alpha], \quad (3)$$

where:

$$s^{colEnt}(T) \stackrel{def}{=} \Sigma_{j=1}^{m} H(c_j) \times \delta^{j-1}, \quad (4)$$

and $H(c_j)$ denotes the entropy of $c_j$. Let $\#_j(x)$ denote the number of table records that include value x in column $c_j$. Then $H(c_j) \stackrel{def}{=} -\Sigma_x p_j(x) \log p_j(x)$, where $$p_j(x) \stackrel{def}{=} \frac{\#_j(x)}{\Sigma_{x'} \#_j(x')}.$$

$\alpha \in [0,1]$ and $\delta \in [0,1]$ are two learnable parameters, namely—they may be tuned based on statistical or machine learning-based analysis of a large number of interestingness scores.

As step 306 completes, provided is a pool of candidate tables each having its own preliminary ranking.

In step 308, an intrinsic table similarity score may be calculated for each of the candidate tables, based on the query and the auxiliary field. This score may represent the relevancy of specific table modalities to a certain information need expressed by the query.

As briefly mentioned above, each table $T \in \mathcal{T}$ contains an auxiliary field which is dedicated for passage retrieval. Let g now denote a single passage, and let g·s denote its starting position within its containing text. Candidate passages $g \in T$ may be extracted from the auxiliary field using a partially-overlapping sliding window. The size of the window may be defined as a number of characters (e.g., 30-100, 101-200, 201-300, 301-400, 401-500, etc.) or a number of words (e.g., 3-10, 11-20, 21-30, 31-40, 41-50, 51-60, 61-70, etc.), and the overlap may either be defined by a fixed number of characters/words or as a ratio to the defined window size.

Next, each candidate passage $g \in T$ may be scored using a combination of two query-dependent and one query-independent scores, as follows:

$$s_q(g) \stackrel{def}{=} s_q^{BM25[k1,b]}(g) \times s_q^{coord}(g) \times posBias(g). \quad (5)$$

Here, $s_q^{BM25[k1,b]}(g)$, denotes the BM25 score (with tunable k1 and b parameters) of passage g. In turn, $s_q^{coord}(g)$ scores passage g with respect to its coordination with query q, namely—passages that cover many unique query terms are preferred, and may be calculated as follows:

$$s_q^{coord}(g) \stackrel{def}{=} \Sigma_{w \in q \cap g} idf(w) \times \min(tf(w,g), \phi_q(w) \times tf(w, q))), \quad (6)$$

where tf(w,x) and idf(w) denote the term frequency in text x and inverse document frequency in the entire table corpus $\mathcal{T}$ of a given word w, respectively.

$$\phi_q(w) \stackrel{def}{=} 1 + \frac{idf(w)}{\sum_{w' \in q} idf(w')}$$

is a scaling factor, biasing for coverage of more informative query terms. These query-dependent scores therefore indicate the relevance of the query to passage g.

$$posBias(g) \stackrel{def}{=} 1 + \frac{1}{\log_2(2 + g \cdot s)}$$

is a query-independent position bias, which biases the previous query-dependent relevancies in favor of candidate passages appearing earlier within their containing auxiliary field. Such bias allows to put more emphasis on passages that match the most descriptive (and general) table parts (preferring the title first, then caption, and then schema); this in comparison to the rows data which tends to contain more specific information. Among table rows, this bias will still prefer rows that appear at the top of the table, based on the assumption that such rows typically attract more attention from searchers.

Finally, the intrinsic similarity score of a given table $T \in \mathcal{T}$ may be assigned as the highest one of the biased query-dependent relevancies, i.e.:

$$s_q^{TabISim}(T) \stackrel{def}{=} \max_{g \in T} s_q(g). \quad (7)$$

In step 310, an extrinsic table similarity score may be calculated for each of the candidate tables, based on a cluster hypothesis of the candidate tables, which assumes that similar tables tend to behave similarly with respect to relevance to information needs. Let $sim(T_i, T_j)$ now denote the inter-table (namely, table-to-table) similarity of a pair of tables $T_i, T_j \in \mathcal{T}$. Such similarity may be calculated according to the following multi-field similarity:

$$sim(T_i, T_j) \stackrel{def}{=} \Sigma_f \omega_f \times sim_B(T_i[f], T_j[f]), \quad (8)$$

where $\omega_f$ denotes the relative weight of field f (having $\Sigma_f \omega_f = 1$), and $$sim_B(T_i[f], T_j[f]) \stackrel{def}{=} \sum_{w \in T_i[f] \cap T_j[f]} \sqrt{p_{\hat{\theta}_{T_i[f]}}(w) \times p_{\hat{\theta}_{T_j[f]}}(w)}$$

denotes the Bhattacharyya (A. Bhattacharyya, "On a Measure of Divergence between Two Multinomial Populations," Sankhyā: The Indian Journal of Statistics, 7, 4 (1946), 401-406) similarity (coefficient) with respect to field f between the two tables' unsmoothed unigram language models (Jay M. Ponte et al., "A Language Modeling Approach to Information Retrieval," in Proceedings of the 21$^{st}$ Annual International ACM SIGIR Conference on Research and Development in Information Retrieval (SIGIR '98) New York, N.Y., USA, 275-281 (1998)). As in Ponte et al., for a given text x and word w:

$$p_{\hat{\theta}_x}(w) \stackrel{def}{=} \frac{tf(w, x)}{\sum_{w'} tf(w', x)}.$$

Once inter-table similarities have been calculated for every pair of tables among the candidate tables, the goal is to derive a table scoring strategy that will score similar tables more or less the same for a given information need. To achieve that, manifold-based ranking may be used to learn the extrinsic scoring function $s_q^{ext}(\cdot)$. To this end, for a given pool of k candidate tables $\{T_i\}_{i=1}^k$, with corresponding basic retrieval scores $\{s_q(T_i)\}_{i=1}^k$, the following regularized objective function may be minimized:

$$\min_{s_q^{ext}} \frac{1}{2} \sum_{i,j=1}^{k} W_{ij} \left\| \frac{s_q^{ext}(T_i)}{\sqrt{D_{ii}}} - \frac{s_q^{ext}(T_j)}{\sqrt{D_{jj}}} \right\|^2 + \frac{1}{2} \mu \sum_{i=1}^{k} \|s_q^{ext}(T_i) - s_q(T_i)\|^2, \quad (9)$$

where W is a similarity matrix (with $W_{ij} \stackrel{def}{=} sim(T_i, T_j)$), D is a diagonal matrix (with $D_{ii} = \sum_i W_{ij}$), and $\mu > 0$ is a tunable regularization parameter (the higher μ is, the more emphasis is given to the basic retrieval scores $s_q$).

As in Zhou et al. (Id.), the solution to such optimization problem has approximately the following closed form (expressed in a vector notation):

$$s_q^{TabESim} \stackrel{def}{=} (1-\beta)(I-\beta S)^{-1} s_q, \quad (10)$$

where I is an identity matrix, $$S = D^{-1/2} W D^{-1/2} \text{ and } \beta = \frac{1}{1+\mu}.$$

In step 312, the preliminary rankings, the intrinsic table similarity scores, and the extrinsic table similarity scores are finally combined, to obtain final scores for the candidate tables and re-rank them. Optionally, the combination employs a cascade-based re-ranking approach. First, the extrinsic table similarity scores are combined with the preliminary rankings, which involves applying the manifold-based ranking approach on the pool of candidate tables. Then, the results of this first step are combined with the intrinsic table similarity scores, for example using a Comb-Mult approach as in Oren Kurland et al., "Fusion in Information Retrieval: SIGIR 2018 Half-Day Tutorial," in The 41$^{st}$ International ACM SIGIR Conference on Research & Development in Information Retrieval (SIGIR '18), ACM, New York, N.Y., USA, 1383-1386 (2018). This manner of gradual combination ensures that no bias is added to the basic table scores (i.e., $s_q$) used by the manifold ranker, which assumes that tables are scored as a whole and not according to some more focused scoring.

The combined, final scoring may then be calculated (in a vector notation; where ⊙ denotes the element-wise vector multiplication) as follows:

$$s_q^{TabIESim} \stackrel{def}{=} s_q^{TabIESim} \odot s_q^{TabISim}. \quad (11)$$

Finally, in step 314, a list of the re-ranked candidate tables may be provided to the user who submitted the query. The list may be ordered according to the final scores (rankings) of these tables. The list may include the tables themselves (or a portion of each table), a link to where each of the tables is stored (e.g., a URL the document containing it), or both.

Experimental Results

The present ad-hoc table retrieval technique was tested against various basic and state-of-the-art table retrieval techniques, to evaluate its contribution to the relevancy of retrieved tables.

The experiments were conducted on the WikiTables corpus (C. S. Bhagavatula et al., "TabEL: Entity Linking in Web Tables," in Proceedings of The 14$^{th}$ International Semantic Web Conference, 2015) which includes approximately 1.6 million tables extracted from Wikipedia, The Free Encyclopedia. The corpus includes, for each table, its Wikipedia article title, section title (if available), caption, schema, and tabular data. To complement this corpus, the texts of (almost) all of its Wikipedia articles were additionally fetched, to be used as a context field.

The experiments utilized the same WikiTables benchmark that was previously used by Li Zhang et al., "Table2Vec: Neural Word and Entity Embeddings for Table Population and Retrieval," in Proceedings of the 42$^{nd}$ International ACM SIGIR Conference on Research and Development in Information Retrieval (SIGIR '19), ACM, New York, N.Y., USA, 1029-1032 (2019), and by Shuo Zhang et al., "Ad Hoc Table Retrieval using Semantic Similarity," in Proceedings of the 2018 World Wide Web Conference (WWW '18), Geneva, Switzerland, 1553-1562 (2018).

The WikiTables benchmark includes a total of 60 queries, and judges tables on a three point scale: 0 (non-relevant), 1 (somewhat relevant), and 2 (highly relevant).

Following Li Zhang et al. 2019 and Shuo Zhang et al. 2018 (Id.), table retrieval quality was measured in the experiments using the Normalized Discounted Gain (NDCG) measure at cutoffs k∈{5,10,20} (abbreviated as N@5, N@10 and N@20, respectively). Further measured were Precision (P@5 and P@10) and Mean Average Precision (MAP), which are common measures used in re-ranking tasks.

Table 1 shows the results of a first experiment, which compared the present ad-hoc table retrieval technique and its various extensions to two basic table retrieval methods, "Single-field" and "Multi-Field," both based on the default BM25 scoring available in the Elasticsearch open source search engine (Elastic NV, Amsterdam, the Netherlands).

TABLE 1

| Method | P@5 | P@10 | N@5 | N@10 | N@20 | MAP |
|---|---|---|---|---|---|---|
| Single-field | 47.33 | 42.17 | 47.81 | 49.27 | 55.22 | 39.86 |
| Multi-field | 54.00 | 46.50 | 54.13 | 55.92 | 61.15 | 44.77 |
| Interp | 54.00 | 47.83 | 53.75 | 56.48 | 62.63 | 44.69 |
| TabInt | 56.00 | 46.83 | 56.11 | 56.48 | 62.48 | 45.31 |
| Interp + TabInt | 54.00 | 48.50 | 55.26 | 58.30 | 64.58 | 46.65 |
| TabISim | 58.67 | 50.33 | 62.38 | 63.04 | 67.91 | 49.78 |
| TabESim | 55.67 | 48.50 | 56.85 | 58.31 | 64.83 | 46.94 |
| TabIESim | 60.00 | 51.00 | 64.98 | 64.79 | 69.35 | 51.24 |

In the "Single-field" method, all modalities were represented as a single, searchable field.

In the "Multi-field" method, tables were represented as multi-field documents, having each field containing the text of one of the table modalities. Field weights $\{\varphi_f\}$ were tuned using Coordinate Ascent, of Donald Metzler et al., "Linear feature-based models for information retrieval", Information Retrieval 10, 3, 257-274 (2007).

In the "Interp" method, the tables obtained by the Multi-field method were re-ranked (via a CombMult approach) using an interpolation of the table's score with its containing article's (BM25) score.

In the "TabInt" method, the tables obtained by the Multi-field method were re-ranked (via a CombMult approach) using each table's interestingness (static) score.

In the "Interp+TabInt" method, Interp with TabInt were combined using a CombMult approach.

TabIESim is the present ad-hoc table retrieval technique that combines intrinsic and extrinsic similarities, and TabISim and TabESim are partial methods the implement just the intrinsic or extrinsic similarities, respectively.

First, as one can observe in Table 1, using a multi-field document representation approach is better then just representing the table as a single-field document. On top of that, the extensions (Interp and TabInt) proposed in certain embodiments result in an improved pool of candidate tables for re-ranking.

As one can further observe, among the two types pf table similarities (TabISim and TabESim), utilizing an intrinsic similarity (TabISim) results in a more significant boost in retrieval quality than utilizing an extrinsic similarity (TabESim). Furthermore, TabISim significantly improves Interp+TabInt (e.g., +9%, +13% and +7% in P@5, N@5 and MAP, respectively).

Overall, the combination of both intrinsic and extrinsic similarities (TabIESim) was the superior method of all.

Table 2 shows the results of a second experiment, which compared the present ad-hoc table retrieval technique with four state-of-the-art table retrieval methods.

TABLE 2

| Method | P@5 | P@10 | N@5 | N@10 | N@20 | MAP |
|---|---|---|---|---|---|---|
| LTR | 52.67 | 45.17 | 55.27 | 54.56 | 60.31 | 41.12 |
| STR | 58.33 | 53.67 | 59.51 | 62.93 | 68.25 | 51.41 |
| T2vW | 56.67 | 50.67 | 59.74 | 60.96 | 65.05 | 46.75 |
| T2vE | 55.00 | 47.00 | 56.02 | 55.69 | 61.61 | 41.76 |
| TabIESim | 60.00 | 51.00 | 64.98 | 64.79 | 69.35 | 51.24 |

"LTR" is a method proposed by Shuo Zhang et al. 2018 (Id.), which implements a pointwise learning-to-rank (LTR) method, trained using different query, table and query-table features (18 in total).

"STR" is another method proposed by Shuo Zhang et al. 2018 (Id.), which extends LTR with 16 additional semantic table similarity features: bag-of-concepts, bag-of-entities, word and graph embeddings (calculated using one early and three late fusion strategies).

"T2VW" and "T2VE" are methods proposed by Li Zheng et al. 2019 (Id.), "Table2Vec: Neural Word and Entity Embeddings for Table Population and Retrieval," in Proceedings of the 42$^{nd}$ International ACM SIGIR Conference on Research and Development in Information Retrieval (SIGIR '19), ACM, New York, N.Y., USA, 1029-1032 (2019), which extend the LTR feature-set with Table2Vec (T2V) embeddings learned from words (in T2VW) or entities (in T2VE) appearing in the table.

As can be seen in Table 2, compared to the state-of-the-art methods, and STR specifically, TabIESim has provided a significantly better quality in most quality measures and especially in NDCG, which was the official quality metric used in both Shuo Zhang et al. 2018 (Id.) and Li Zheng et al. 2019 (Id.) for this task. Overall, the improvements over the best method were +8%, +3% and +2% in N@5, N@10 and N@20, respectively. TabIESim was also+3% better in P@5 compared to the best method, yet only inferior to STR in P@10 and insignificantly in MAP.

It is important to note that, except for LTR, all the other three methods seek to improve table representation by employing auxiliary semantic information (e.g., concepts, entities, and various embeddings). This in comparison to TabIESim whose intrinsic and extrinsic similarities are solely based on relatively simple lexical (exact word) matching. This is, therefore, yet another strong empirical evidence on the added value of such similarities for the ad-hoc table retrieval task.

A third experiment assessed the potential of TabIESim in complementing and improving the four state-of-the-art methods. To this end, TabIESim was employed for re-ranking the tables retrieved by each of the state-of-the-art methods. Here, these methods serve as a better choice for initial table retrieval, which is then sought to be improved by considering also the intrinsic and extrinsic table similarities. The results of this assessment are shown in Table 3.

TABLE 3

| Method | P@5 | P@10 | N@5 | N@10 | N@20 | MAP |
|---|---|---|---|---|---|---|
| TabIESim alone | 60.00 | 51.00 | 64.98 | 64.79 | 69.35 | 51.24 |
| LTR + TabIESim | 57.33 | 49.00 | 63.18 | 62.23 | 65.04 | 46.27 |
| STR + TabIESim | 63.00 | 53.67 | 67.61 | 67.84 | 72.48 | 54.96 |
| T2vW + TabIESim | 60.67 | 50.83 | 66.39 | 65.02 | 68.36 | 50.00 |
| T2vE + TabIESim | 58.67 | 50.00 | 62.67 | 61.94 | 65.12 | 45.52 |

First, comparing the results for the four methods in Table 2 with those seen in Table 3, one can observe that utilizing TabIESim together with any of these methods has always resulted in a quality boost. For example, for P@5, the improvements are +9%, +8%, +7% and +7%, for the LTR, STR, T2vW and T2vE methods, respectively. As another example, for N@5, the improvements are +13%, +14%, +11% and +12%, for the LTR, STR, T2vW and T2vE methods, respectively. These empirical results further shed light on the potential of using such intrinsic and extrinsic similarities for the ad-hoc table retrieval task, augmenting a semantically-rich ranker with new table-similarity dimensions.

Next, as can be further observed in Table 3, by employing STR for initial table retrieval and TabIESim for re-ranking the former's ranked list, one can obtain further improvement in quality. Compared to the basic method that was employed together with TabIESim in Table 1 (i.e., Interp+TabInt), using STR has obtained significant improvements in all measures (e.g., +5% and +4% in P@5 and N@5, respectively).

The above experimental results clearly demonstrate the merits of utilizing both intrinsic and extrinsic table similarities for enhanced ad-hoc table retrieval. Moreover, such similarities have been shown here to nicely augment other strong alternatives which already employ a diversity of task-engineered and semantically-rich table features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of a numerical range should be considered to have specifically disclosed all the possible subranges as well as individual numerical values within that range. For example, description of a range from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising, automatically:
representing each of a plurality of tables as a multi-field text document in which:
different modalities of the table are represented as separate fields, and
a concatenation of all the modalities is represented as a separate, auxiliary field;
receiving a query;
executing the query on the multi-field text documents, to retrieve a list of candidate tables out of the plurality of tables, wherein the candidate tables have preliminary rankings which result from the execution of the query;
calculating an intrinsic table similarity score for each of the candidate tables, based on the query and the auxiliary field, wherein said calculation of the intrinsic table similarity score comprises, for each of the candidate tables:
extracting candidate passages from the auxiliary field using a partially-overlapping sliding window applied to the auxiliary field,
calculating a relevancy of the query to each of the candidate passages,
biasing the calculated relevancies in favor of candidate passages appearing earlier in the auxiliary field, and
using a highest one of the biased calculated relevancies as the intrinsic table similarity score of the respective candidate table;
calculating an extrinsic table similarity score for each of the candidate tables, based on a cluster hypothesis of the candidate tables;
combining: the preliminary rankings, the intrinsic table similarity scores, and the extrinsic table similarity scores, to re-rank the candidate tables; and
providing an ordered list of the re-ranked candidate tables.

2. The method of claim 1, wherein said calculation of the extrinsic table similarity scores comprises:
calculating an inter-table similarity of every pair of tables of the candidate tables, and
performing manifold-based ranking of the candidate tables, based on the calculated inter-table similarities and on the preliminary rankings.

3. The method of claim 1, wherein the multiple modalities of each of the plurality of tables comprise at least some of:
a title of an electronic document which contains the respective table;
a caption of the table, appearing adjacent to the respective table in the electronic document;
a schema defined by column labels of the respective table; and
tabular data contained in cells of the respective table.

4. The method of claim 3, wherein the tabular data comprise:
an ordered concatenation of rows of the respective table from top to bottom, wherein, in each of the rows:
when the respective table is in a language written from left-to-right, cells of the row are concatenated from left to right,
when the respective table is in a language written from right-to-left, cells of the row are concatenated from right to left.

5. The method of claim 3, wherein: said retrieval of the list of candidate tables is based on individual weights that are assigned to the separate fields of the multi-field text documents.

6. The method of claim 3, wherein:
a further modality of each of a plurality of tables comprises contents of the electronic document which contains the respective table; and
said retrieval of the list of candidate tables is based on a relevance of the query to the contents of the electronic document.

7. The method of claim 3, wherein said retrieval of the list of candidate tables is based on an interestingness score calculated for each of the plurality of tables, wherein the interestingness score increases with greater diversity of tabular data contained in earlier-appearing columns of the respective table.

8. The method of claim 1, wherein said combination is performed in the following order:
(a) the extrinsic table similarity scores are combined with the preliminary rankings; and
(b) the intrinsic table similarity scores are combined with (a).

9. A system comprising:
(a) at least one hardware processor; and
(b) a non-transitory computer-readable storage medium having program code embodied therewith, the program code executable by said at least one hardware processor to automatically:
represent each of a plurality of tables as a multi-field text document in which:
different modalities of the table are represented as separate fields, and
a concatenation of all the modalities is represented as a separate, auxiliary field,
receive a query,
execute the query on the multi-field text documents, to retrieve a list of candidate tables out of the plurality of tables, wherein the candidate tables have preliminary rankings which result from the execution of the query,
calculate an intrinsic table similarity score for each of the candidate tables, based on the query and the auxiliary field, wherein said calculation of the intrinsic table similarity score comprises, for each of the candidate tables:
extracting candidate passages from the auxiliary field using a partially-overlapping sliding window applied to the auxiliary field,
calculating a relevancy of the query to each of the candidate passages,
biasing the calculated relevancies in favor of the candidate passages appearing earlier in the auxiliary field, and
using a highest one of the biased calculated relevancies as the intrinsic table similarity score of the respective candidate table;
calculate an extrinsic table similarity score for each of the candidate tables, based on a cluster hypothesis of the candidate tables,
combine: the preliminary rankings, the intrinsic table similarity scores, and the extrinsic table similarity scores, to re-rank the candidate tables, and
provide an ordered list of the re-ranked candidate tables.

10. The system of claim 9, wherein said calculation of the extrinsic table similarity scores comprises:
    calculating an inter-table similarity of every pair of tables of the candidate tables, and
    performing manifold-based ranking of the candidate tables, based on the calculated inter-table similarities and on the preliminary rankings.

11. The system of claim 9, wherein the multiple modalities of each of the plurality of tables comprise at least some of:
    a title of an electronic document which contains the respective table;
    a caption of the table, appearing adjacent to the respective table in the electronic document;
    a schema defined by column labels of the respective table; and
    tabular data contained in cells of the respective table.

12. The system of claim 11, wherein the tabular data comprise:
    an ordered concatenation of rows of the respective table from top to bottom, wherein, in each of the rows:
        when the respective table is in a language written from left-to-right, cells of the row are concatenated from left to right,
        when the respective table is in a language written from right-to-left, cells of the row are concatenated from right to left.

13. The system of claim 11, wherein: said retrieval of the list of candidate tables is based on individual weights that are assigned to the separate fields of the multi-field text documents.

14. The system of claim 11, wherein:
    a further modality of each of a plurality of tables comprises contents of the electronic document which contains the respective table; and
    said retrieval of the list of candidate tables is based on a relevance of the query to the contents of the electronic document.

15. The system of claim 11, wherein said retrieval of the list of candidate tables is based on an interestingness score calculated for each of the plurality of tables, wherein the interestingness score increases with greater diversity of tabular data contained in earlier-appearing columns of the respective table.

16. The system of claim 9, wherein said combination is performed in the following order:
    (i) the extrinsic table similarity scores are combined with the preliminary rankings; and
    (ii) the intrinsic table similarity scores are combined with (i).

17. A computer program product comprising a non-transitory computer-readable storage medium having program code embodied therewith, the program code executable by at least one hardware processor to automatically:
    represent each of a plurality of tables as a multi-field text document in which:
        different modalities of the table are represented as separate fields, and
        a concatenation of all the modalities is represented as a separate, auxiliary field;
    receive a query;
    execute the query on the multi-field text documents, to retrieve a list of candidate tables out of the plurality of tables, wherein the candidate tables have preliminary rankings which result from the execution of the query;
    calculate an intrinsic table similarity score for each of the candidate tables, based on the query and the auxiliary field, wherein said calculation of the intrinsic table similarity score comprises, for each of the candidates tables:
        extracting candidate passages from the auxiliary field using a partially-overlapping sliding window applied to the auxiliary field,
        calculating a relevancy of the query to each of the candidate passages,
        biasing the calculated relevancies in favor of candidate passages appearing earlier in the auxiliary field, and
        using a highest one of the biased calculated relevancies as the intrinsic table similarity score of the respective candidate table;
    calculate an extrinsic table similarity score for each of the candidate tables, based on a cluster hypothesis of the candidate tables;
    combine: the preliminary rankings, the intrinsic table similarity scores, and the extrinsic table similarity scores, to re-rank the candidate tables; and
    provide an ordered list of the re-ranked candidate tables.

18. The computer program product of claim 17, wherein: said calculation of the extrinsic table similarity scores comprises:
    calculating an inter-table similarity of every pair of tables of the candidate tables, and
    performing manifold-based ranking of the candidate tables, based on the calculated inter-table similarities and on the preliminary rankings.

* * * * *